United States Patent
Chikura et al.

(10) Patent No.: US 7,998,348 B2
(45) Date of Patent: Aug. 16, 2011

(54) SPIRAL MEMBRANE ELEMENT AND PROCESS FOR PRODUCING THE SAME

(75) Inventors: Shinichi Chikura, Ibaraki (JP); Katsumi Ishii, Ibaraki (JP); Hideki Matsuda, Ibaraki (JP); Masashi Beppu, Ibaraki (JP); Hiroki Fujioka, Ibaraki (JP); Yasuhiro Uda, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 255 days.

(21) Appl. No.: 12/282,138

(22) PCT Filed: Mar. 7, 2007

(86) PCT No.: PCT/JP2007/054466
§ 371 (c)(1),
(2), (4) Date: Sep. 8, 2008

(87) PCT Pub. No.: WO2007/102551
PCT Pub. Date: Sep. 13, 2007

(65) Prior Publication Data
US 2009/0026130 A1    Jan. 29, 2009

(30) Foreign Application Priority Data

Mar. 9, 2006  (JP) .................................. 2006-064409

(51) Int. Cl.
*B01D 63/10* (2006.01)
*B01D 61/00* (2006.01)

(52) U.S. Cl. ............ 210/321.83; 210/321.85; 210/493.4

(58) Field of Classification Search .................. None
See application file for complete search history.

(56) References Cited

U.S. PATENT DOCUMENTS

| 3,386,876 | A |   | 6/1968 | Wyckoff |
|---|---|---|---|---|
| 4,022,692 | A |   | 5/1977 | Janneck |
| 4,213,858 | A |   | 7/1980 | Boberg et al. |
| 4,902,417 | A |   | 2/1990 | Lien |
| 5,073,263 | A |   | 12/1991 | Fagundes et al. |
| 5,114,582 | A |   | 5/1992 | Sandstrom et al. |
| 5,128,037 | A | * | 7/1992 | Pearl et al. ............... 210/321.74 |

(Continued)

FOREIGN PATENT DOCUMENTS

EP  0 478 111    4/1992

(Continued)

OTHER PUBLICATIONS

Da Costa et al., "Net-type spacers: Effect of configuration on fluid flow path and ultrafiltration flux." *Ind. Eng. Chem. Res.*, vol. 33, 1994: 1845-1851.

(Continued)

*Primary Examiner* — Krishnan S Menon
(74) *Attorney, Agent, or Firm* — Knobbe Martens Olson & Bear LLP

(57) ABSTRACT

An object of the present invention is to provide a spiral membrane element that can form a uniform fiber reinforcement layer on an outer circumferential surface by a simple process without a great change in the materials, as well as a process for producing the same. The spiral membrane element of the present invention is a spiral membrane element which is provided with a cylindrical roll R in which a separation membrane, a feed-side flow passageway member, and a permeate-side flow passageway member 3 are spirally wound in a laminate state around a perforated center tube 5 and in which a sealing part for preventing mixing of feed-side fluid and permeate-side fluid is disposed, wherein at least one sheet of the permeate-side flow passageway member 3 has a fiber cloth 23a extended or connected to the outer circumferential side, and the fiber cloth 23a is wound around an outer circumference of said cylindrical roll R, impregnated with a resin and hardened to thereby form a fiber reinforcement layer.

9 Claims, 2 Drawing Sheets

U.S. PATENT DOCUMENTS

| | | | |
|---|---|---|---|
| 5,562,827 A * | 10/1996 | Schmidt et al. ............ 210/493.4 |
| 6,106,715 A | 8/2000 | Thalmann et al. |
| 6,565,747 B1 | 5/2003 | Shintani et al. |
| 6,881,336 B2 | 4/2005 | Johnson |
| 7,326,659 B2 | 2/2008 | Cederblad et al. |
| 7,326,660 B2 | 2/2008 | Walraevens et al. |
| 2003/0205520 A1 | 11/2003 | Johnson |
| 2004/0182774 A1 | 9/2004 | Hirokawa et al. |
| 2005/0077229 A1 | 4/2005 | Ishii |
| 2005/0194317 A1 * | 9/2005 | Ikeyama et al. ............... 210/652 |
| 2007/0062857 A1 | 3/2007 | Popa et al. |
| 2007/0175812 A1 | 8/2007 | Chikura et al. |
| 2007/0196185 A1 | 8/2007 | Kohel et al. |
| 2007/0199654 A1 | 8/2007 | Kohel et al. |
| 2008/0190836 A1 | 8/2008 | Beppu et al. |
| 2009/0065426 A1 | 3/2009 | Ishii et al. |
| 2010/0096316 A1 | 4/2010 | Chikura et al. |
| 2010/0108593 A1 | 5/2010 | Chikura et al. |

FOREIGN PATENT DOCUMENTS

| | | |
|---|---|---|
| EP | 0 508 646 | 10/1992 |
| GB | 2164871 A | 4/1986 |
| JP | 53-124179 | 10/1978 |
| JP | 62-27701 | 2/1987 |
| JP | 4-018921 | 1/1992 |
| JP | 4-326926 | 11/1992 |
| JP | 05-123545 | 5/1993 |
| JP | 5-168869 | 7/1993 |
| JP | 06-007649 | 1/1994 |
| JP | 10-137558 | 5/1998 |
| JP | 10-309445 | 11/1998 |
| JP | 11-235520 | 8/1999 |
| JP | 2000-000437 | 1/2000 |
| JP | 2000-042378 | 2/2000 |
| JP | 2000-153270 | 6/2000 |
| JP | 2000-354742 | 12/2000 |
| JP | 2001-017840 | 1/2001 |
| JP | 2001-300271 | 10/2001 |
| JP | 2004-050005 | 2/2004 |
| JP | 2004-283708 | 10/2004 |
| JP | 2005-103516 | 4/2005 |
| JP | 2005-178010 | 7/2005 |
| JP | 2005-279377 | 10/2005 |
| JP | 2006-507919 | 3/2006 |
| JP | 2007-531616 | 11/2007 |
| WO | WO 03/092872 A1 | 11/2003 |
| WO | WO 2004/009222 A1 | 1/2004 |
| WO | WO 2005/097305 A1 | 10/2005 |

OTHER PUBLICATIONS

Song et al., "Numerical studies of the impact of spacer geometry on concentration polarization in spiral wound membrane modules." *Ind. Eng. Chem. Res.*, vol. 44, 2005: 7638-7645.

File History of the related U.S. Appl. No. 10/593,760, for the period of Sep. 30, 2008-Jan. 15, 2009.

File History of the related U.S. Appl. No. 11/722,659, for the period of Sep. 30, 2008-Jan. 15, 2009.

File History of the related U.S. Appl. No. 12/137,317, for the period of Sep. 30, 2008-Jan. 15, 2009.

File History of the related U.S. Appl. No. 12/282,550, for the period of Sep. 30, 2008-Jan. 15, 2009.

File History of the related U.S. Appl. No. 10/593,760, for the period of Jan. 16, 2009-May 6, 2009.

File History of the related U.S. Appl. No. 11/722,659, for the period of Jan. 16, 2009-May 6, 2009.

File History of the related U.S. Appl. No. 12/137,317, for the period of Jan. 16, 2009-May 6, 2009.

File History of the related U.S. Appl. No. 12/282,550, for the period of Jan. 16, 2009-May 6, 2009.

International Preliminary Report on Patentability issued on the related PCT Application No. PCT/JP2005/004919, dated Apr. 26, 2005.

International Preliminary Report on Patentability issued on the related PCT Application No. PCT/JP2006/321371, dated May 6, 2008.

International Search Report issued on the related PCT Application No. PCT/JP2005/004919, dated Apr. 26, 2005.

International Search Report issued on the related PCT Application No. PCT/JP2006/321371, dated Dec. 26, 2006.

International Search Report issued on the corresponding PCT Application No. PCT/JP2007/054466, dated Jun. 12, 2007.

International Search Report issued on the related PCT Application No. PCT/JP2007/054637, dated Jun. 12, 2007.

Microfilm of the specification and drawings annexed to the request of Japanese Utility Model Application No. 025197/1981 (Laid-open No. 140803/1982).

File History of the related U.S. Appl. No. 10/593,760, as of Sep. 29, 2008.

File History of the related U.S. Appl. No. 11/722,659, as of Sep. 29, 2008.

File History of the related U.S. Appl. No. 12/137,317, as of Sep. 29, 2008.

File History of the related U.S. Appl. No. 12/282,550, as of Sep. 29, 2008.

File History of the related U.S. Appl. No. 10/593,760, for the period of May 7, 2009-Dec. 9, 2010.

File History of the related U.S. Appl. No. 11/722,659, for the period of May 7, 2009-Dec. 9, 2010.

File History of the related U.S. Appl. No. 12/137,317, for the period of May 7, 2009-Dec. 9, 2010.

File History of the related U.S. Appl. No. 12/282,550, for the period of May 7, 2009-Dec. 9, 2010.

File History of the related U.S. Appl. No. 12/642,400, as of Dec. 9, 2010.

File History of the related U.S. Appl. No. 12/642,653, as of Dec. 9, 2010.

\* cited by examiner (a)

(b)

SPIRAL MEMBRANE ELEMENT AND PROCESS FOR PRODUCING THE SAME

This application is the U.S. National Phase under 35 U.S.C. §371 of International Application No. PCT/JP2007/054466, filed Mar. 7, 2007, which claims priority to the Japanese Patent Application No. 2006-064409, filed Mar. 9, 2006. The International Application was not published in English under PCT Article 21(2).

TECHNICAL FIELD

The present invention relates to a spiral membrane element in which a separation membrane, a feed-side flow passageway member, and a permeate-side flow passageway member are spirally wound in a laminate state around a perforated center tube and which can separate specific components that are present in various fluids (liquid or gas), as well as to a process for producing the same.

BACKGROUND ART

Conventionally, as a fluid separation element used for reverse osmosis filtration, micro filtration, or the like, a spiral membrane element is known which is provided with a cylindrical roll R in which a separation membrane 1, a feed-side flow passageway member 2, and a permeate-side flow passageway member 3 are spirally wound in a laminate state around a perforated center tube 5 and in which sealing parts 11 to 13 for preventing mixing of feed-side fluid and permeate-side fluid are disposed, for example, as shown in FIG. 5.

In this spiral membrane element, the feed-side fluid (feed water) is led to the separation membrane 1 surface by the feed-side flow passageway member 2 and, after being separated by permeating through the separation membrane 1, the permeate-side fluid (permeated water) is led along the permeate-side flow passageway member 3 to the center tube 5 (water collection tube). Then, in such a spiral membrane element, there are cases in which a fiber reinforced plastic (FRP) is disposed on the outer circumference as an external material for the purpose of imparting a pressure resistance property and a shape retaining property at the time of pressurization operation (illustration is not given).

As shown in FIGS. 6(a) to (b), such a spiral membrane element is produced generally by fabricating a separation membrane unit U by stacking a material in which a feed-side flow passageway member 2 is disposed between the two sheets of a two-folded separation membrane 1 onto a permeate-side flow passageway member 3, and applying adhesives 4 and 6 for forming a sealing part that prevents mixing of feed-side fluid and permeate-side fluid to the permeate-side flow passageway member 3 located on the separation membrane peripheral parts (three sides), and spirally winding a single or a plurality of this unit U around a center tube 5, followed by sealing the separation membrane peripheral parts. This example is a case in which a plurality of membrane leaves (sealed envelope-shaped membrane) is present; however, there are cases in which a single membrane leaf is present.

Also, for forming the external material, there is known a process in which, generally after the membrane leaf is wound on the center tube and the sealing resin is hardened, a glass roving (an assembled body made of strands of glass filaments) impregnated with a resin is wound around the outer circumferential surface of the cylindrical roll, and this is hardened and formed as an FRP (for example, see the patent documents 1 to 2).

However, with the above-described process, the external material is implemented after winding the membrane leaf and sealing, thereby necessitating a step of winding the external material and a hardening step in addition to the hardening-waiting time for sealing. In particular, it is a cumbersome and time-consuming step to perform winding so as to obtain a uniform reinforcement effect in winding the glass roving impregnated with a resin. For this reason, with the above-described process, the production step becomes complex, requires a long period of time, and is disadvantageous in terms of costs including the matter of materials.

Patent Document 1: Japanese Patent Application Laid-Open (JP-A) No. 2001-17840

Patent Document 2: Japanese Patent Application Laid-Open (JP-A) No. 2000-354742

DISCLOSURE OF THE INVENTION

Problems to be Solved by the Invention

Therefore, an object of the present invention is to provide a spiral membrane element that can form a uniform fiber reinforcement layer on an outer circumferential surface by a simple process without a great change in the materials, as well as a process for producing the same.

Means for Solving the Problems

The aforementioned object can be achieved by the undermentioned present invention. The spiral membrane element of the present invention is a spiral membrane element which is provided with a cylindrical roll in which a separation membrane, a feed-side flow passageway member, and a permeate-side flow passageway member are spirally wound in a laminate state around a perforated center tube and in which a sealing part for preventing mixing of feed-side fluid and permeate-side fluid is disposed, wherein at least one sheet of the permeate-side flow passageway member has a fiber cloth extended or connected to the outer circumferential side, and the fiber cloth is wound around an outer circumference of said cylindrical roll, impregnated with a resin and hardened to thereby form a fiber reinforcement layer.

According to the spiral membrane element of the present invention, the permeate-side flow passageway member has a fiber cloth extended or connected to the outer circumferential side, and the fiber cloth is wound around an outer circumference of the cylindrical roll, impregnated with a resin and hardened to thereby form a fiber reinforcement layer. Therefore, a uniform fiber reinforcement layer can be formed on an outer circumferential surface by a simple process without a great change in the materials. For this reason, the production step can be simplified; the production time can be shortened; and the spiral membrane element can be produced advantageously in terms of costs. In the present invention, the spiral membrane element can be produced by a more simplified process without a great change in the materials particularly when the permeate-side flow passageway member has a fiber cloth extended to the outer circumferential side.

With respect to the above, a resin sheet can be wound in the inner part or in the inside of the fiber reinforcement layer. Conventionally, since the outside of the fiber reinforced plastic has unevenness, it is difficult to bond a display label, and also, since it is brought into contact with the feed water, there has been a possibility that it is peeled off during the use. However, according to the present invention, such a problem does not occur by winding a resin sheet (including a display label and the like) in the inner part or in the inside of the fiber reinforcement layer.

Also, the process for producing a spiral membrane element of the present invention contains a step of forming a cylindrical roll by spirally winding a separation membrane, a feed-side flow passageway member, and a permeate-side flow passageway member in a laminate state around a perforated center tube and a step of forming a sealing part for preventing mixing of feed-side fluid and permeate-side fluid, wherein a material having a fiber cloth extended or connected to the back end side of winding in which a resin is applied to the fiber cloth is used as at least one sheet of the permeate-side flow passageway member among said permeate-side flow passageway member, and said resin is hardened after said fiber cloth is wound on the outer circumference of said cylindrical roll in forming said cylindrical roll.

According to the production process of the present invention, a material having a fiber cloth extended or connected to the back end side of winding in which a resin is applied to the fiber cloth is used as the permeate-side flow passageway member. Therefore, a uniform fiber reinforcement layer can be formed without a great change in the materials. Also, the resin is hardened after the extended part of the fiber cloth is wound on the outer circumference of the cylindrical roll in forming the cylindrical roll. Therefore, the fiber reinforcement layer can be formed by a simple process; the production time can be shortened; and the spiral membrane element can be produced advantageously in terms of costs.

With respect to the above, it is preferable that the extended part of the fiber cloth is wound together with a peeling sheet having a peeling property to the resin, and the peeling sheet is peeled off and removed after the resin is hardened, thereby to cut and remove the extraneous extended part. By using such a peeling sheet and peeling and removing the peeling sheet after hardening, foreign substances can be prevented from adhering to the outer surface of the fiber reinforcement layer, and the unevenness can be prevented from becoming more liable to be generated on the outer surface.

Also, it is preferable that an adhesive having a thixotropy property is used in forming the sealing part, and a resin having viscosity lower than that of the adhesive is used as the resin to be applied on the fiber cloth. It is preferable to use a resin having a high viscosity as the resin (the adhesive) that forms the sealing part. By having a thixotropy property of retaining the shape without being fluidized at the time of application and in a stationary state after winding and of widening in the gap in correspondence with the fastening stress at the time of winding, the resin will not be dropped off, and a good sealing part can be formed. Also, when the resin of the fiber reinforcement layer that is wound around the outer circumference has viscosity lower than that of the resin that is used in the sealing part, the resin will have a good impregnation property to the reinforcement material such as a glass cloth, and the transparency will be improved, whereby the visibility and recognizability of the product label will be good.

From such a viewpoint, it is preferable that the viscosity of the adhesive is 5000 to 100000 mPa·s as measured by using a #6 rotor in a BH-type viscometer under the condition of 20 rpm, and the viscosity of the resin to be applied to the fiber cloth is 100 to 10000 mPa·s under the same condition.

Figure 1:
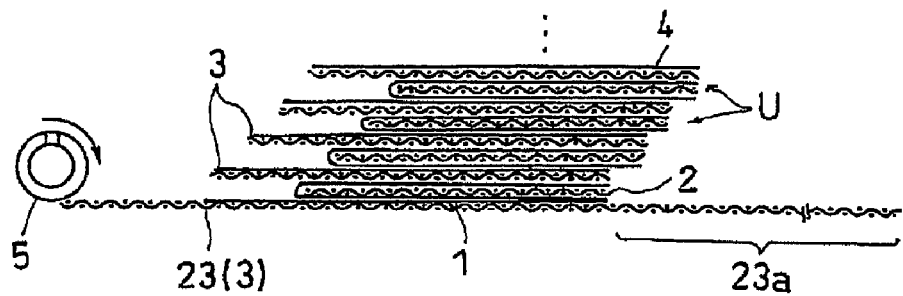
FIG. 1 is a step view showing one example of a process for producing a spiral membrane element of the present invention.

DESCRIPTION OF THE SYMBOLS 1 separation membrane
2 feed-side flow passageway member
3 permeate-side flow passageway member
4 adhesive
5 center tube
6 adhesive
23 fiber cloth
23a fiber cloth (extended part)
24 resin sheet
25 resin
25' fiber reinforced plastic
26 peeling sheet
27 hot-melt adhesive
R cylindrical roll
U separation membrane unit

BEST MODES FOR CARRYING OUT THE INVENTION

Figure 2:
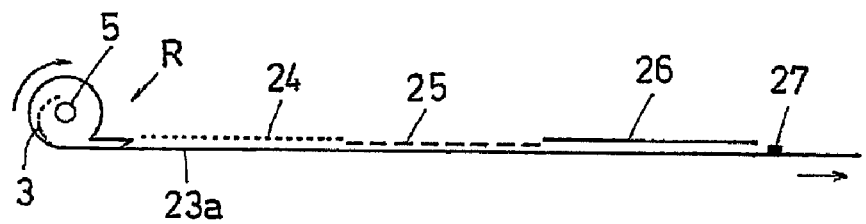
FIG. 2 is a step view showing one example of a process for producing a spiral membrane element of the present invention.
Figure 3:
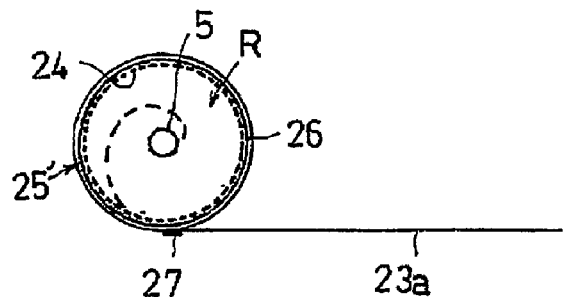
FIG. 3 is a step view showing one example of a process for producing a spiral membrane element of the present invention.
Figure 4:
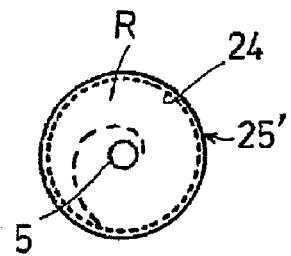
FIG. 4 is a front view showing one example of a spiral membrane element of the present invention.

Hereafter, embodiments of the present invention will be described with reference to the drawings. FIGS. 1 to 3 are step views showing one example of a process for producing a spiral membrane element of the present invention. FIG. 4 is a front view showing one example of a spiral membrane element of the present invention.

In the spiral membrane element of the present invention, only the forming process and the structure of the external material are different from those of the conventional one, so that, for the other structures, all of the above-described construction of the conventional spiral membrane element can be applied.

Figure 5:
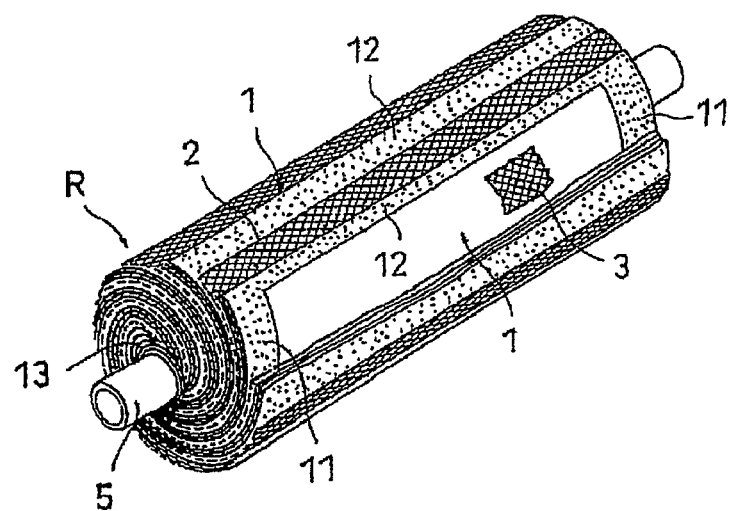
FIG. 5 is a step view showing one example of a process for producing a conventional spiral membrane element.

Therefore, the spiral membrane element of the present invention is provided with a cylindrical roll R in which a separation membrane 1, a feed-side flow passageway member 2, and a permeate-side flow passageway member 3 are spirally wound in a laminate state around a perforated center tube 5 and a sealing part for preventing mixing of feed-side fluid and permeate-side fluid is disposed, as shown in FIG. 5. The sealing part includes, for example, the two-end sealing part 11 and the outer circumferential side sealing part 12, and also an inner circumferential side sealing part 13 can be formed in order to carry out sealing of the peripheries of the center tube 5.

The spiral membrane element of the present invention can be produced through a step of forming a cylindrical roll R by spirally winding a separation membrane 1, a feed-side flow passageway member 2, and a permeate-side flow passageway member 3 in a laminate state around a perforated center tube 5 and a step of forming sealing parts 11 and 12 for preventing mixing of feed-side fluid and permeate-side fluid.

Specifically, first, the spiral membrane element can be produced by performing the step shown in FIG. 1. FIG. 1 is a front view showing a state before the separation membrane units are laminated and wound, where each of the separation membrane units U is basically the same as the one shown in FIG. 6(a).

Figure 6:
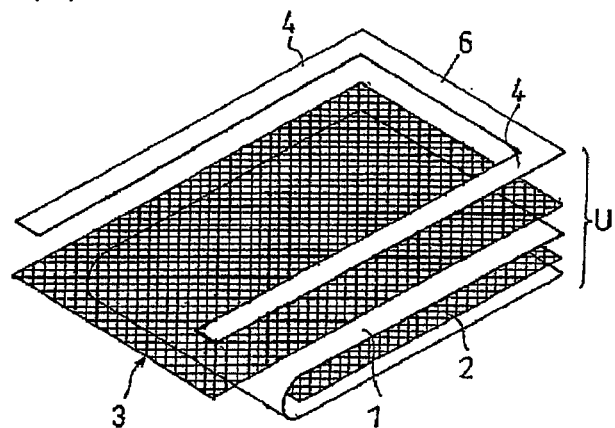
FIG. 6 is a partially fractured perspective view showing one example of a conventional spiral membrane element.
Figure 6:
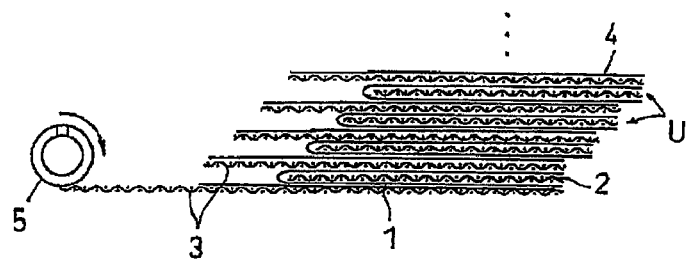

As shown in FIG. 6(a), first, a unit is prepared by stacking a material in which a feed-side flow passageway member 2 is disposed between the two sheets of a two-folded separation membrane 1 onto a permeate-side flow passageway member 3, and applying adhesives 4 and 6 for forming a sealing part that prevents mixing of feed-side fluid and permeate-side fluid to the two end parts in the axial direction and the final end part of winding of the permeate-side flow passageway member 3. At this time, a protective tape may be bonded at the folding part of the separation membrane 1.

For the separation membrane 1, a reverse osmosis membrane, an ultrafiltration membrane, a micro filtration membrane, a gas separation membrane, a degassing membrane, and the like can be used. For the feed-side flow passageway member 2, a net-shaped material, a mesh-shaped material, a sheet having a groove, a wave-shaped sheet, or the like can be used. For the permeate-side flow passageway member 3, a fiber cloth such as non-woven cloth, woven cloth, or knitted cloth, a net-shaped material, a mesh-shaped material, a sheet having a groove, a wave-shaped sheet, or the like can be used.

The perforated center tube 5 may be one having an opening around a tube, so that any of the conventional ones can be used. Generally, the center tube 5 is formed with a material such as ABS resin, polyphenylene ether (PPE), or polysulfone (PSF), and the diameter thereof is, for example, 20 to 100 mm though it depends on the size of the membrane element.

As the adhesives 4 and 6, any of the conventionally known adhesives such as a urethane series adhesive, an epoxy series adhesive, and a hot melt adhesive can be used. However, in performing the hardening reaction by heating, an adhesive containing a thermosetting resin such as a urethane series adhesive or an epoxy series adhesive is preferable.

In particular, in the present invention, it is preferable to use an adhesive having a thixotropy property in forming a two-end sealing part 11 and/or an outer circumferential side sealing part 12. For the resin (the adhesive) that forms the sealing parts 11 and 12, it is preferable to use a resin having a high viscosity. By having a thixotropy property of retaining the shape without being fluidized at the time of application and in a stationary state after winding and of widening in the gap in correspondence with the fastening stress at the time of winding, the resin will not be dropped off, and a good sealing part can be formed. For the adhesives having a thixotropy property, various ones using a urethane, an epoxy resin or the like are commercially available.

Here, the thixotropy is a phenomenon that appears when the state of the dispersed system solution or the like is switched alternately between the sol and the gel in accordance with the stress, and is a phenomenon that is seen in a dispersed system solution that is liable to be gelled. In the state without a stress, it is in a gel state and does not exhibit the fluidity. However, when an external force is applied, a part or the whole of the inter-molecular force of the gel structure is destroyed, whereby it will be in a sol state to restore the fluidity. Also, when the external force stops acting, the gel structure is regenerated again, whereby the fluidity is lost again.

The viscosity of the adhesive is preferably 5000 to 100000 mPa·s, more preferably 20000 to 50000 mPa·s, as measured by using a #6 rotor in a BH-type viscometer under the condition of 20 rpm. When the thixotropy property is exhibited, the ratio of the viscosities under different stresses will be large. For example, the viscosity at 2 rpm will be two times or more of the viscosity at 20 rpm. Those in which the ratio is three times to seven times are preferable.

Next, as shown in FIG. 1, a plurality of these separation membrane element units U are laminated and wound in a spiral form around a perforated center tube 5.

As shown in FIGS. 1 to 4, the spiral membrane element of the present invention is characterized in that at least one sheet of the permeate-side flow passageway member 3 has a fiber cloth 23a extended or connected to the outer circumferential side, and the fiber cloth 23a is wound around an outer circumference of the cylindrical roll R, impregnated with a resin and hardened to thereby form a fiber reinforcement layer 25'. The present embodiment shows an example in which one sheet of the permeate-side flow passageway member 3 is constituent with the fiber cloth 23 having the fiber cloth 23a extended to the outer circumferential side.

As shown in FIGS. 1 to 4, such a fiber reinforcement layer 25' can be formed by using a material having a fiber cloth 23a extended or connected to the back end side of winding in which a resin is applied to the fiber cloth 23a as at least one sheet of the permeate-side flow passageway member 3 among the permeate-side flow passageway member 3, and hardening the resin after the fiber cloth 23a is wound on the outer circumference of the cylindrical roll R in forming the cylindrical roll R. The present embodiment shows an example in which the permeate-side flow passageway member 3 fixed to the center tube 5 is constituent with the fiber cloth 23 and has the extended fiber cloth 23a, as shown in FIG. 1.

Therefore, in the steps shown in FIGS. 1 to 2, the tip end of the fiber cloth 23 which is a long permeate-side flow passageway member 3 is adhered or pressure-sensitive adhered to the center tube 1 and, after being mounted on the permeate-side flow passageway member 3 while applying a resin to the sealing part of the separation membrane unit U, it is wound around the center tube 5 to form the cylindrical roll R.

For the fiber cloth 23 which is a reinforcing phase (supporter) of the fiber reinforcement layer 25', those made of a material such as PET, PP, PE, PSF, polyphenylene sulfide (PPS), or the like can be used in the event that it is used as the permeate-side flow passageway member 3. The kind of the fiber cloth 23 may be, for example, non-woven cloth, woven cloth, knitted cloth, or the like, and the thickness is preferably 0.2 to 1 mm.

For the resin to be applied to the fiber cloth 23a, a polyurethane resin or an epoxy resin that is used at the time of forming the cylindrical roll R can be used as it is; however, in the fiber reinforcement layer 25' corresponding to the external material, the kind of the resin can be changed relative to the resin used in the cylindrical roll R.

As the resin to be applied to the fiber cloth 23a, it is preferable to use a resin having viscosity lower than that of the adhesives 4 and 6 that form the sealing parts 11, 12. This gives that the resin will have a good impregnation property to the reinforcement material such as a glass cloth, and the transparency will be improved, whereby the visibility and recognizability of the product label will be good.

The viscosity of the resin to be applied to the fiber cloth 23a is preferably 100 to 10000 mPa·s, more preferably 500 to 7000 mPa·s, and further more preferably 1000 to 3000 mPa·s, as measured by using a #6 rotor in a BH-type viscometer under the condition of 20 rpm. As such a resin, a polyurethane resin, an epoxy resin, or the like can be included.

As described above, for the resin used in the step of forming the sealing parts 11 and 12 and the resin of the fiber reinforcement layer 25' that fixes the outer circumference of the roll, it is preferable to use resins that are each functionally different.

For the combination of the urethane resin and the epoxy resin, they can be combined in accordance with the intended usage; however, in the case that requires a heat resistance, for example, it is preferable to use an epoxy resin for both of the resins of the sealing parts 11, 12 and the fiber reinforcement layer 25'.

The number of the separation membrane units T to be laminated is determined in accordance with the permeation flow rate that is needed, and may sufficiently be one or more layers; however, about 100 layers is an upper limit in consideration of the operability. Here, the longer the length of the separation membrane unit U is, the smaller the number of laminations will be.

The present embodiment shows an example in which the resin sheet 24 is wound in the inner part or in the inside of the fiber reinforcement layer 25' in a state of being adhered to the resin, as shown in FIG. 4. Also, the present embodiment shows an example of including the step in which the fiber cloth 23$a$ is wound together with a peeling sheet 26 having a peeling property to the resin, and an interface of the peeling sheet 26 is peeled off after the resin is hardened, thereby to cut and remove the peeled off part, as shown in FIG. 2

In this embodiment, the part where the resin sheet 24 is mounted, the part where the resin 25 is applied, the part where the peeling sheet 26 is mounted, the part where the hot melt adhesive 27 is applied, and the part where only the fiber cloth is present are disposed on the extended fiber cloth 23$a$ sequentially in the order from the tip end side of winding, as shown in FIG. 2.

The part where the resin 25 is applied is preferably disposed for one to five rounds so that a sufficient strength of the fiber reinforcement layer 25' will be obtained. Here, the hot melt adhesive 27 is disposed so as to perform hot melt adhesion so that the fastening force will not be weakened in the end. The hot melt adhesive 27 is applied in the width direction, and provisional fixation is carried out until the resin is hardened.

As the peeling sheet 26, any of those having a peeling property to the resin may be used, and sheets, films and papers to which a silicone resin, a fluororesin, various peeling agent or the like is applied besides sheets and films of PE, PP, PET, and the like can be included. The peeling sheet 26 is preferably wound for the length of one round or more. The resin sheet 24 may be adhered to the resin of the fiber reinforcement layer 25', or may be pressure-sensitive adhered by disposing a pressure-sensitive adhesive layer on the resin sheet 24.

As the resin sheet 24, those having a good close adhesion to the cylindrical roll R and having a property of following are preferable, and sheets, films, and the like of PP, PE, polyvinyl chloride (PVC), polystyrene (PS), rubber, or the like can be included. Such a resin sheet 24 can also be used as a display label. In the case of using it as a display label, printing for display or the like is carried out on the outer circumferential side thereof, and about one round thereof is wound. Also, the display label may be disposed approximately for the entire width in the width direction. A product name, a company name, a suitable design, and the like can be displayed on the display label.

Here, in winding the resin sheet 24, the position of winding the resin sheet 24 may be any position on the roll surface or near the surface of the fiber reinforcement layer 25'. Also, the fiber reinforcement layer 25' may be made to be a multiple layer according to the length of winding. In that case, the resin sheet may be disposed in the midway of the fiber reinforcement layer 25'.

To such an extended part, the cylindrical roll R is wound while applying a tension to the back end side of winding, and is subjected to hot melt adhesion as shown in FIG. 3 to obtain a membrane element before hardening. This is hardened in this state by heating or the like. The condition at the time of hardening is suitably set in accordance with the resin to be used, the kind of the adhesive and the like.

The sealing of the separation membrane unit U (cylindrical roll R) with resin and the hardening of the resin of the fiber reinforcement layer 25' may be separately carried out; however, in the present invention, it is preferable to carry out the sealing of the separation membrane unit U (cylindrical roll R) with resin and the hardening of the resin of the fiber reinforcement layer 25' simultaneously. In that case, it is preferable to use the same kind of resin for both of the resins. Namely, in performing the hardening reaction by heating, it is preferable to use a resin containing a thermosetting resin such as a urethane series adhesive or an epoxy series adhesive.

After the resin is hardened, the interface of the peeling sheet 26 is peeled off, and the peeled off part is cut and removed, thereby to obtain a spiral membrane element in which a fiber reinforcement layer 25' having a more flat outer surface is formed, as shown in FIG. 4.

In the spiral membrane element, trimming or the like of the two end parts of the cylindrical roll R may be carried out after the sealing with resin, so as to adjust the length in the axial direction. Further, a perforated end member, a sealing material, a reinforcing material, or the like may be disposed as necessary for the prevention of deformation (telescope or the like).

Other Embodiments (1) In the above-described embodiment, an example has been shown in which one sheet of the permeate-side flow passageway member has a fiber cloth extended to the outer circumferential side; however, it may be one in which the permeate-side flow passageway member has a fiber cloth connected to the outer circumferential side. In that case, the fiber reinforcement layer is formed by using those having a fiber cloth connected to the back end side of winding in which a resin is applied to the fiber cloth as the permeate-side flow passageway member.

In the case of connecting the fiber cloth to the permeate-side flow passageway member, it is also possible to use a glass fiber cloth such as a glass cloth, a metal fiber cloth such as a metal mesh screen, or the like besides the fiber cloth made of resin. Also, in that case, the thickness of the connected fiber cloth is preferably 0.1 to 1 mm, more preferably 0.2 to 0.5 mm.

Here, a plurality of sheets (for example, two sheets to the whole number of leaves) of the permeate-side flow passageway member may have a fiber cloth extended or connected to the outer circumferential side to form a fiber reinforcement layer. In that case, in applying the adhesives 4 and 6, the resin may be applied to the extended or connected fiber cloth, and the winding may be carried out after the lamination.

(2) In the above-described embodiment, an example has been shown in which the permeate-side flow passageway member fixed to the center tube is constituent with a fiber cloth and has an extended fiber cloth. However, a fiber cloth may be extended or connected to the permeate-side flow passageway member that is not fixed to the center tube to form the fiber reinforcement layer.

(3) In the above-described embodiment, an example has been shown in which the part where the resin sheet 24 is mounted, the part where the resin 25 is applied, the part where the peeling sheet 26 is mounted, the part where the hot melt adhesive 27 is applied, and the part where only the fiber cloth is present are disposed, as shown in FIG. 2. However, in the present invention, the whole or a part of those other than the part where the resin 25 is applied can be omitted.

(4) In the above-described embodiment, an example has been shown in which the separation membrane is two-folded to sandwich the feed-side flow passageway member in fabricating the separation membrane unit. However, a continuous separation membrane may be used and this may be alternately turned and folded to sandwich the feed-side flow passageway member and the permeate-side flow passageway member. In that case, the part to be cut and removed of the permeate-side flow passageway member may be disposed only to the two-end sealing part.

(5) In the above-described embodiment, an example has been described in which the permeate-side flow passageway member 3 is superposed on the separation membrane 1 that is two-folded so as to sandwich the feed-side flow passageway member 2, and the adhesives 4 and 6 are applied, as shown in FIG. 1. However, in the present invention, the two-folded separation membrane 1 may be superposed on the permeate-side flow passageway member 3, and the adhesives 4 and 6 may be applied thereon.

(6) In the above-described embodiment, an example has been shown in which a plurality of separation membrane units U are used so as to produce a spiral membrane element provided with a plurality of membrane leaves as shown in FIG. 1. However, in the present invention, one pair of separation membrane units U may be used so as to produce a spiral membrane element provided with one sheet of a membrane leaf. In that case, the one sheet of the permeate-side flow passageway member to be used will have a fiber cloth that is extended or connected to the outer circumferential side.

EXAMPLES

Hereafter, Examples and the like that show the constitution and effects of the present invention in a specific manner will be described.

Example 1

First, a membrane leaf unit made of an RO membrane ES20 manufactured by Nitto Denko Corporation. and a feed-side flow passageway member made of PP and having a thickness of 0.7 mm was prepared. Next, the tip end of the permeate-side flow passageway member made of PET and having a thickness of 0.3 mm was fixed to a hollow center tube made of PPE and having a diameter of 32 mm, and the membrane leaf unit was mounted on the permeate-side flow passageway member while applying a polyurethane resin at the part corresponding to the sealing part.

Next, the mounted membrane leaf unit was wound while rotating the hollow center tube around the axis and applying a tension. Subsequently after the membrane leaf unit was wound, a resin sheet for display was wound by the length corresponding to the circumferential length of the roll. Next, the permeate-side flow passageway member at the back of the resin sheet was impregnated with a polyurethane resin over the entire surface by the length corresponding to the circumferential length of the roll, and the resin sheet was successively wound.

Subsequently, a peeling sheet was placed on the permeate-side flow passageway member and wound so that the peeling sheet would cover the outside of the fiber reinforced plastic completely. A hot melt resin was applied in the width direction at the part immediately after the peeling sheet was wound, and provisional fixation was made so that the fastened roll would not be loosened.

After the resin was hardened, the outer layer of the peeling sheet was cut and opened, and the peeling sheet was peeled off and removed to fabricate a spiral membrane element. The outer surface of the membrane element became smooth, and the display of the resin sheet for display in the inside of the fiber reinforcement layer was sufficiently visible and recognizable. Also, as the fiber reinforcement layer, it had a strength that can sufficiently withstand in actual operation.

Example 2

A spiral membrane element was fabricated in the same manner as in the Example 1 except that an adhesive having a thixotropy property (a polyurethane resin, a two-liquid type adhesive that mixes polyurethane and polyisocyanate) was used as the adhesive of the sealing part, and an epoxy resin having a low viscosity (a two-liquid setting resin that mixes a bisphenol A type epoxy resin and a polyamideamine) was used as the resin to be applied to the permeate-side flow passageway member in the Example 1. Here, regarding the viscosity of the adhesive and the viscosity of the above-described resin, those having 28000 mPa·s and 2000 mPa·s, respectively, as measured by using a #6 rotor in a BH-type viscometer under the condition of 20 rpm, were used.

At the time of applying the adhesive and in the stationary state after winding, the adhesive had not been fluidized and the shape had been retained. At the time of winding, a sealing part without the drop-off of the resin could be formed due to the thixotropy property. The outer surface of the obtained membrane element became smooth; the impregnation property of the resin was good to improve the transparency; and the display of the resin sheet for display in the inside of the fiber reinforcement layer was more vividly visible and recognizable. Also, as the fiber reinforcement layer, it had a strength that can sufficiently withstand in actual operation.

What is claimed is:

1. A process for producing a spiral membrane element comprising a step of forming a cylindrical roll by spirally winding a separation membrane a feed-side flow passageway member, and a permeate-side flow passageway member in a laminate state around a perforated center tube and a step of forming a sealing part for preventing mixing of feed-side fluid and permeate-side fluid,
   wherein a material extended to the back end side of the winding or a material having a fiber cloth connected to the back end side of the winding in which a resin is applied to the extended material or the fiber cloth, is used as at least one sheet of the permeate-side flow passageway member among said permeate-side flow passageway member and said resin is hardened after said extended material or fiber cloth is wound on the outer circumference of said cylindrical roll in forming said cylindrical roll;
   wherein said fiber cloth is wound together with a peeling sheet having a peeling property to said resin, and an interface of said peeling sheet is peeled off after said resin is hardened, thereby to cut and remove the peeled off part.

2. The process for producing a spiral membrane element according to claim 1, wherein a resin sheet is wound in the inner part or in the inside of said fiber reinforcement layer.

3. The process for producing a spiral membrane element according to claim 1, wherein an adhesive having a thixotropy property is used in forming said sealing part, and a resin having viscosity lower than that of said adhesive is used as the resin to be applied to said fiber cloth.

4. The process for producing a spiral membrane element according to claim 3, wherein the viscosity of said adhesive is 5000 to 100000 mPa·s as measured by using a #6 rotor in a BH-type viscometer under the condition of 20 rpm, and the viscosity of the resin to be applied to said fiber cloth is 100 to 10000 mPa·s under the same condition.

5. The process for producing a spiral membrane element according to claim 1, wherein an adhesive having a thixotropy property is used in forming said sealing part, and a resin having viscosity lower than that of said adhesive is used as the resin to be applied to said fiber cloth.

6. The process for producing a spiral membrane element according to claim 3, wherein the viscosity of said adhesive at 2 rpm as measured by using a #6 rotor in a BH-type viscometer is two times more than the viscosity of said adhesive at 20 rpm.

7. The process for producing a spiral membrane element according to claim 3, wherein said adhesive comprises a thermosetting resin.

8. The process for producing a spiral membrane element according to claim 1, wherein the fiber cloth contacts the perforated center tube.

9. The process for producing a spiral membrane element according to claim 1, wherein at least a portion of the fiber cloth is disposed between at least a portion of at least one of the separation membranes and the perforated center tube.

* * * * *

UNITED STATES PATENT AND TRADEMARK OFFICE
CERTIFICATE OF CORRECTION

| | | |
|---|---|---|
| PATENT NO. | : 7,998,348 B2 | |
| APPLICATION NO. | : 12/282138 | |
| DATED | : August 16, 2011 | |
| INVENTOR(S) | : Shinichi Chikura et al. | |

It is certified that error appears in the above-identified patent and that said Letters Patent is hereby corrected as shown below:

At Column 9, line 45, please change "Corporation." to --Corporation--.

At Column 10, line 42, in Claim 1, please change "membrane" to --membrane,--.

At Column 10, line 45, in Claim 1, please change "fbr" to --for--.

At Column 10, line 49, in Claim 1, please change "winding" to --winding,--.

At Column 10, line 53, in Claim 1, please change "member" to --member,--.

Signed and Sealed this
Twentieth Day of March, 2012

David J. Kappos
*Director of the United States Patent and Trademark Office*